(12) United States Patent
Aloysius

(10) Patent No.: US 11,556,402 B2
(45) Date of Patent: Jan. 17, 2023

(54) METADATA PLANE FOR APPLICATION PROGRAMMING INTERFACE

(71) Applicant: salesforce.com, inc., San Francisco, CA (US)

(72) Inventor: Henry Aloysius, Ashburn, VA (US)

(73) Assignee: Salesforce, Inc., San Francisco, CA (US)

( * ) Notice: Subject to any disclaimer, the term of this patent is extended or adjusted under 35 U.S.C. 154(b) by 74 days.

(21) Appl. No.: 17/159,910

(22) Filed: Jan. 27, 2021

(65) Prior Publication Data

US 2022/0237058 A1 Jul. 28, 2022

(51) Int. Cl.
*G06F 9/54* (2006.01)
*G06F 16/907* (2019.01)
*H04L 67/133* (2022.01)

(52) U.S. Cl.
CPC ............ *G06F 9/547* (2013.01); *G06F 16/907* (2019.01); *H04L 67/133* (2022.05)

(58) Field of Classification Search
CPC ......... G06F 9/541; G06F 9/547; H04L 67/133
See application file for complete search history.

(56) References Cited

U.S. PATENT DOCUMENTS

| | | | |
|---|---|---|---|
| 6,263,370 B1* | 7/2001 | Kirchner | H04L 69/164 709/219 |
| 11,082,338 B1* | 8/2021 | Saha | H04L 43/10 |
| 2018/0278624 A1* | 9/2018 | Kuperman | H04L 9/3271 |
| 2019/0286719 A1* | 9/2019 | Morales | G06F 3/0647 |
| 2019/0349405 A1* | 11/2019 | Bengtson | G06F 21/45 |
| 2020/0285686 A1* | 9/2020 | Murray | G06F 16/9558 |
| 2021/0336788 A1* | 10/2021 | Ziegler | H04L 67/56 |

* cited by examiner

*Primary Examiner* — Brian W Wathen
(74) *Attorney, Agent, or Firm* — Holland & Hart LLP

(57) ABSTRACT

Approaches for data processing are disclosed that include receiving, from a client, an application programming interface (API) request at an API endpoint of an API, where the API endpoint is configured to process data requests at a data plane of the API, identifying, from a header of the API request, a request for metadata associated with the API, redirecting the API request to a metadata plane of the API, retrieving, at the metadata plane of the API, the requested metadata based on the header of the API request, and transmitting, via the API endpoint and to the client, a response message indicating the requested metadata.

18 Claims, 12 Drawing Sheets

METADATA PLANE FOR APPLICATION PROGRAMMING INTERFACE

FIELD OF TECHNOLOGY

The present disclosure relates generally to database systems and data processing, and more specifically to a metadata plane for an application programming interface.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user apparatus (e.g., desktop computers, laptops, smartphones, tablets, or other computing systems, etc.). In addition or as an alternative to the use of a cloud platform, users may also store, manage, and process data on a local machine or other platform utilizing on-premise resources, including an application programming interface. Storage, management, and processing of data may also be performed on any appropriate device capable of such storage, management, processing, and other functions. References to approaches described herein with regard to a cloud platform should also be understood to include the use of local machines, local resources, and any other appropriate platforms for data storage, data management, data processing, and other tasks.

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples. the cloud platform may host an application programming interface (API) to which clients may connect to perform various tasks. To access the API, a client connects to an API endpoint, which receives instructions, commands, or other information from the client to perform the various tasks. However, metadata, metrics, and other information related to the API and its use are not generally available to the client. If it is available, it is generally obtained through a complex process outside of the API.

DETAILED DESCRIPTION

Figure 1:
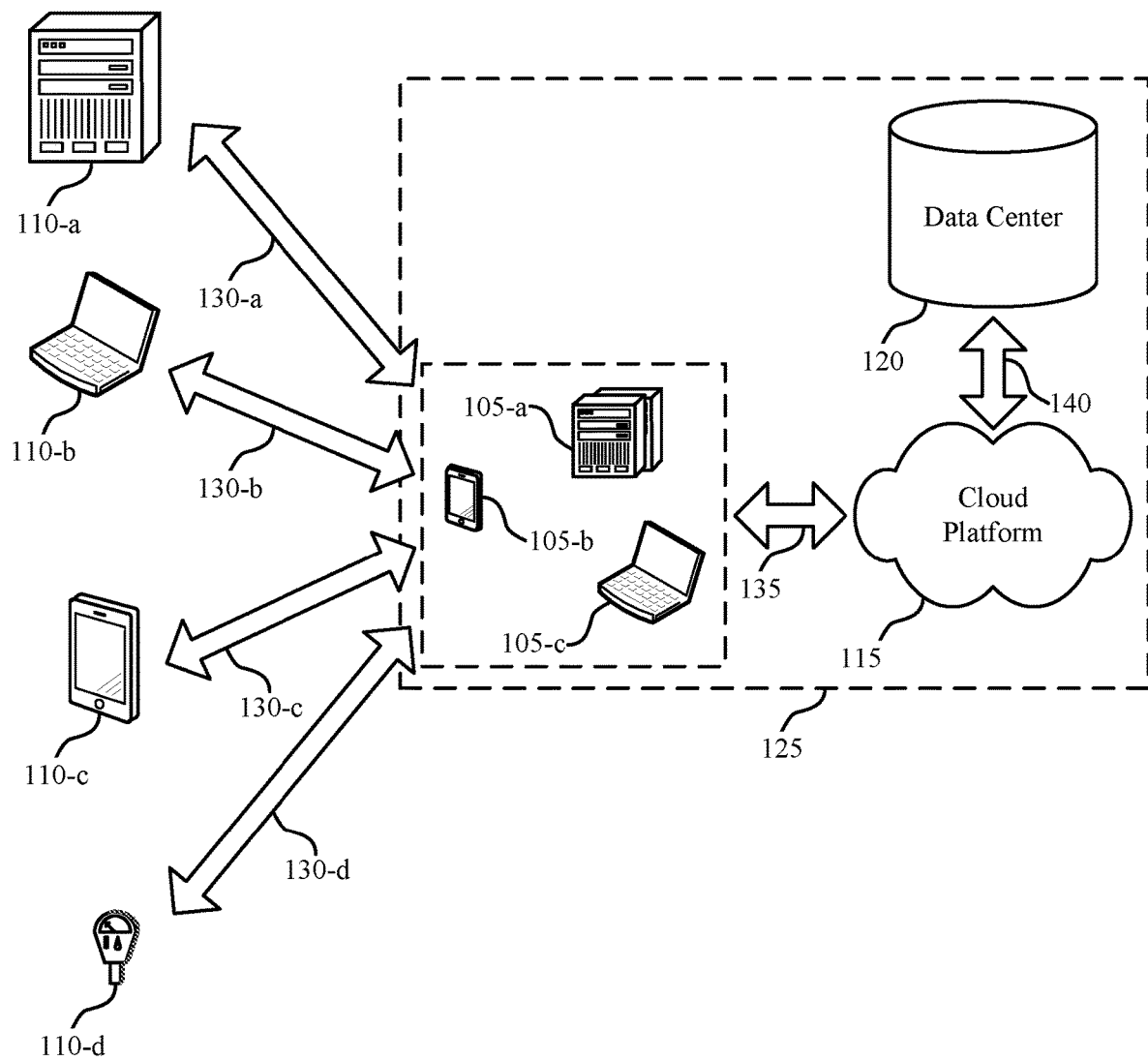
FIG. 1 illustrates an example of a data processing system that supports a metadata plane for application programming interface in accordance with aspects of the present disclosure.

An API offers a convenient portal to access functionality of an application server. One example of an application server may include a database server, as described herein. However, the discussion of a database server is only an example, and should limit the scope of the present subject matter. References to a database server as made herein may also be understood as referring to an application server or other appropriate platform.

By accessing an API, one may perform various functions available at the application server through a streamlined interface. For example, the API may access any backend system implementing a business logic. However, current management aspects of an API are not as streamlined. For example, in most cases metadata, metrics and other management information is not generally available. Any access to metadata, metrics, and other management information is limited, and relies on a complicated process that often involves writing custom code to access the information at a level more complicated than the API interface. In addition, this limited, complicated access is not found within the scope of the API. Some systems are configured such that access to the desired metadata involves accessing an external source to obtain the desired metadata, metrics or other management information. These and other barriers create technical challenges for monitoring and making changes to the usage of an API. In order to efficiently use an API, a client has a need for monitoring the usage and performance of the API and the database server to make informed decisions about the API usage. However, as explained herein, access to this information may be limited, technically difficult to obtain, or both. Even if it is available, it may involve expertise beyond the level of the API interface as well as additional connections outside of the API to access this information.

Techniques described herein support metadata, metrics, and other management information and control commands to be delivered within the scope of the API running on a server or in a service on a server, and without the burdensome custom code. In some examples, a server or service running on a server may be configured to manage the receipt, identification, and redirection of a request for metadata made through the API endpoint, as well as retrieval and transmission of the request of navigator to the client. For example, an API request sent by a client may be received by the server at in an API endpoint that is capable of processing requests to perform the various functions of the API. A request for metadata associated with the API may be identified from a header of the API request. The API request may then be redirected to a metadata plane of the API that is configured for retrieving and providing metadata associated with an API, controlling functionality associated with an API, among other tasks. The requested metadata may then be retrieved, and subsequently transmitted via the API endpoints back to the client. In this way, rules and configurations may be configured at a server and used by the server to receive requests for metadata through an API endpoint, and deliver the requested metadata back through the API endpoint to the client in a way that resolves the technical challenges present in obtaining metadata related to the use of an API.

Some examples of the subject matter discussed herein may redirect the API requests to the metadata plane by transmitting the API request from the data plane to the metadata plane of the API. Other examples of the subject matter may redirect the API requests to the metadata plane by intercepting the API request at a proxy or gateway of the data plane. In some examples, a control message related to the API may be received. This control message may be based on a trigger event. In some examples, the API requests may include requests for configuration metadata or for real-time metrics associated with the API. In some examples, the API request may include a client context information. The response messages sent to the client may contain information selected based on an identity of the client. For example, the response messages may include a number of API calls that a user has used against a quota, information regarding quality of service compliance, or other information related to the use of the API by a particular user. Further, the retrieval of the request for metadata may include consolidating metadata from other sources outside of the metadata plane and storing that metadata in the metadata a plane. In some examples, the request and metadata may be sourced from a management plane of the API itself.

Aspects of the disclosure are initially described in the context of an environment supporting an on-demand database service. Aspects of the disclosure also described by architecture diagrams of systems and process flow diagrams relating to a metadata plane for an application programming interface. Aspects of the disclosure are further illustrated by and described with reference to apparatus diagrams, system diagrams, and flowcharts that relate to a metadata plane for application programming interface.

FIG. 1 illustrates an example of a system 100 for cloud computing that supports a metadata plane for application programming interface in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user apparatus, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing apparatus or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user apparatus, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile apparatus systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the subsystem 125 may be configured to receive an API request (e.g., instructions, commands, or other information sent to an API in the normal course of operating the API) at an endpoint of an API that is supported by the subsystem. In some examples, the endpoint may be the primary point of contact for interfacing with the API through which API requests are sent. This endpoint may be configured to process data requests at a data plane of the API that are related to the various functions supported by the API. In some examples, the API request may be sent by the cloud clients 105, by the contacts 110, or by another client. The subsystem 125 may then identify a request for metadata from a header of the API request. This request may include requests for metadata about the performance of the API, requests for metrics, requests for configuration metadata, control messages, or other requests or information associated with the operation of the API. Once identified, the API request may then be redirected to a management plane or metadata plane of the API. Requested metadata may then be retrieved or requested configuration or control commands may be executed, and a response message indicating the requested metadata may then be sent back to the client through the API endpoint.

In some systems, when an API is used for the various functions that it supports, it is difficult to monitor various aspects of the API. For example, metadata, metrics, and other management information may not be generally available to clients using the API or may not be available through an API endpoint used for typical API calls (e.g., data read calls, data write calls, etc.). In some systems, a management plane receives and stores any metadata, metrics, or other management information. In some systems, this management plane is not exposed to clients as it is impractical to do so. This management plane is generally used by administrators of the API to manage, monitor or control various aspects of the API. As such, clients do not have access to this information. In cases when such information is available, burdensome custom code is used to receive such information, and such coding is much more complicated than the streamlined client-facing interface provided by the API to utilize its various functions.

The subject matter discussed herein may implement rules and configurations used to receive requests for metadata and send that metadata back to the client. Techniques described herein may receive an API request at an API endpoint, identify a request for metadata in the header of the API request, collect the requested metadata, and send the metadata back to the client through the same API endpoint that is capable of processing data requests at a data plane of the API to utilize the various functions supported by the API. In this way, the techniques described herein may resolve the technical challenges present in obtaining API metadata, metrics, and other management information and functions.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, a cloud client 105 may wish to run an API that is supported by the cloud platform 115. The cloud platform 115 may then receive an API request sent from a cloud client 105 through an endpoint of the API capable of processing, at a data plane of the API, data requests or other requests, commands, or instructions related to the various functions supported by the API. The API request may include a header, which may contain various types of information sent by a cloud client 105, such as a request for metadata, a request for metrics, client context information, one or more control messages, management messages, requests for configuration metadata, requests for real-time metrics, or other instructions, commands, or information related to the API. The request for metadata, metrics, etc., as well as client context information and control messages, for example, may be identified. Once identified, the API request may be redirected to a metadata plane of the API. This may be done by transmitting the API request from the data plane to the metadata plane, intercepting the API request at a proxy or gateway of the data plane of the API, or it may be done in other ways. The requested metadata is then retrieved at the metadata plane. In addition to the metadata request), in the case of a control message, management message, or other instructions, a function, process, or command may be executed based on the control message, management message, or other instructions. In some examples, a cloud client 105 may include both requests for metadata as well as control messages, management messages, and the like. In some examples, the particular metadata to be sent in a response message back to the client may be selected based on the metadata request. The response message may then be sent to the client via the API endpoint, the message indicating the requested metadata, metrics, or other management information.

Figure 2:
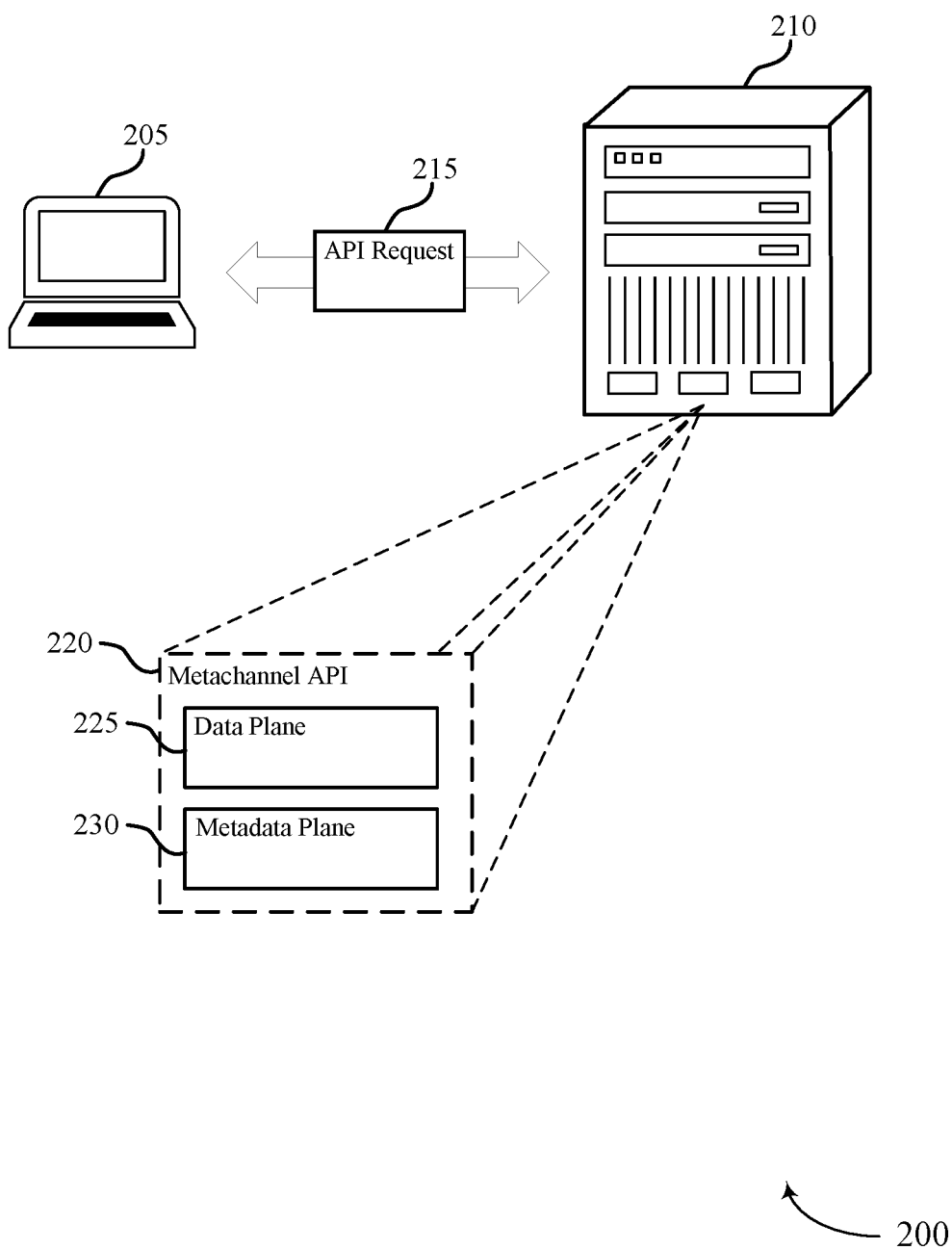
FIG. 2 illustrates an example of an architecture diagram of a system that supports a metadata plane for application programming interface in accordance with aspects of the present disclosure.

FIG. 2 illustrates an example of an example of an architecture diagram of a system that supports a metadata plane for application programming interface in accordance with aspects of the present disclosure. The system 200 may include a client 205. The client 205 may be any appropriate device capable of communicating with other devices such as a laptop computer, desktop computer, server, virtual machine, or other device. In some examples, the client 205 is associated with a tenant of a multi-tenant database system. In such examples, the client 205 may communicate with a server 210 that is also associated with the multi-tenant database system.

The server 210 may host a metachannel API 220. The metachannel API 220 may provide a variety of functions, services, or information to the client 205. The metachannel API 220 may provide a streamlined interface to the client 205 to perform these functions in an efficient manner. In order to access the functions, services, or information of the metachannel API 220, the client 205 may send an API request 215 to the server 210 hosting the metachannel API 220. The API request 215 may include a variety of information, such as instructions or commands for the metachannel API 220 to perform a function or service, such as data processing. In some examples, the API request 215 may also include a request for metadata from the metachannel API 220. In some examples, the request for metadata is located in the header of the API request 215.

In some examples, the metachannel API 220 may include a data plane 225 and a metadata plane 230. The data plane 225 may be used to receive and process an API request 215 received from the client 205 (e.g., a request to read, write, or replace data associated with the API). For example, the data plane 225 may contain an API endpoint through which the client 205 communicates with the metachannel API 220. The data plane 225 may respond to the API request 215 by performing a function or service supported by the metachannel API 220. The data plane 225 may also redirect the API request 215 to the metadata plane 230 in cases in which the API request 215 includes a request from metadata or a request to perform a management or control function for the API. Such redirection may be performed by forwarding the API request 215 from the data plane 225 to the metadata plane 230, or the API request 215 may be intercepted by a proxy or gateway and sent directly to the metadata plane 230. The metadata plane 230 may retrieve the metadata requested in the API request 215 or perform the requested management or control function. Metadata to be retrieved may be stored within the metadata plane 230, or it may be stored elsewhere, including other locations associated with the metachannel API 220 itself.

Figure 3:
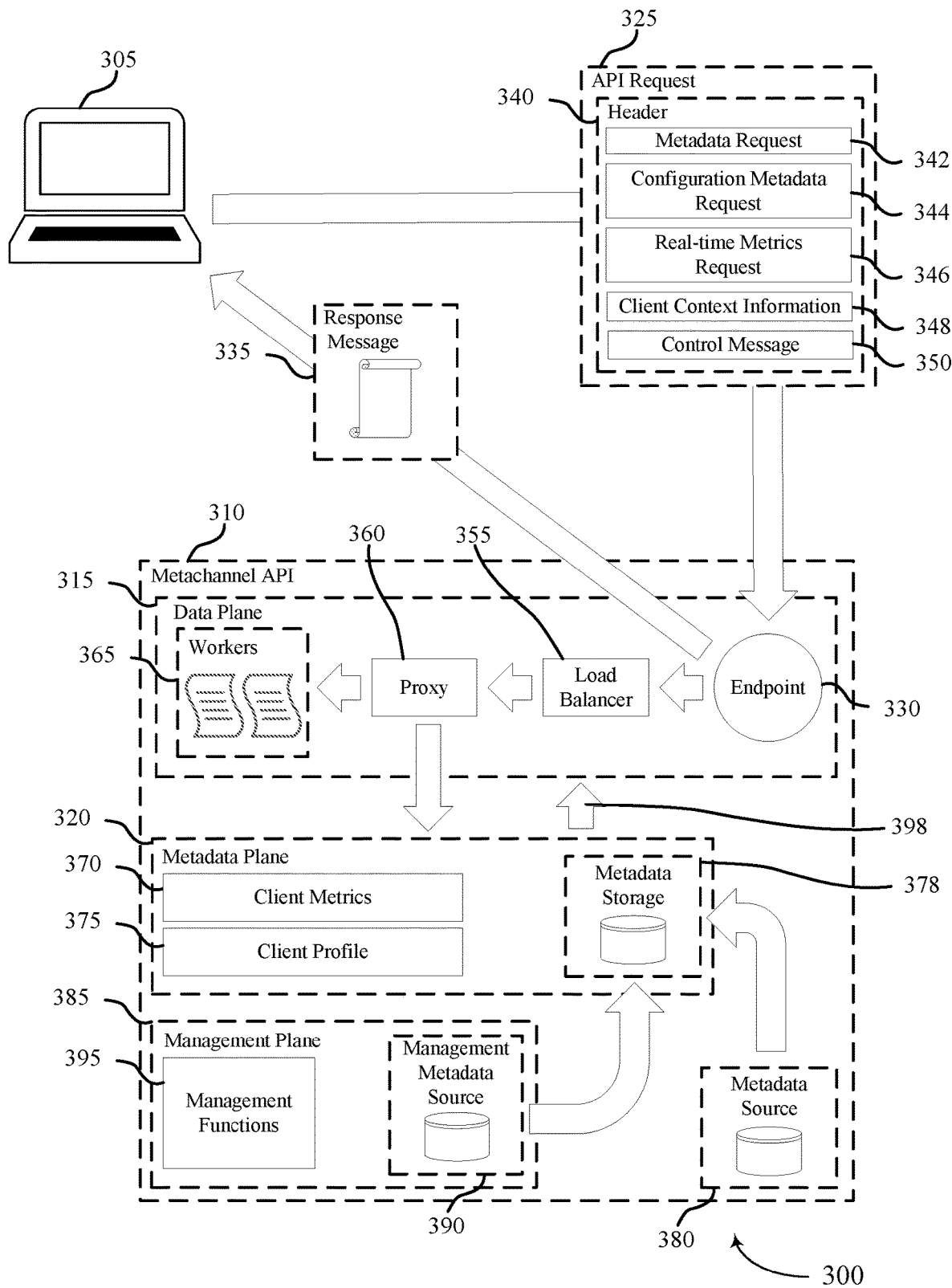
FIG. 3 illustrates an example of an architecture diagram of a system that supports a metadata plane for application programming interface in accordance with aspects of the present disclosure.

FIG. 3 illustrates an example of an architecture diagram of a system 300 that supports a metadata plane for application programming interface in accordance with aspects of the present disclosure. The system 300 may include a client 305, which may be an example of client 205 as described with reference to FIG. 2. The client 305 may communicate with the metachannel API 310 in order to access the functions or information supported by the metachannel API 310. The metachannel API 310 may perform various functions or provide information to the client 305, similar to the metachannel API 220 described in FIG. 2. In some examples, the metachannel API 310 may include the data plane 315 and a metadata plane 320. The data plane 315 may be an example of the data plane 225 as described in FIG. 2. The metadata plane 320 may be an example of the metadata plane 230 described in FIG. 2.

To communicate with the metachannel API 310, the client 305 may send an API request 325 to an endpoint 330 of the metachannel API 310. The endpoint 330 may be the primary interface point for the metachannel API 310 through which the client 305 sends API requests 325. The endpoint 330 may also be the primary point through which the metachannel API 310 communicates back with the client 305. For example, the metachannel API 310 may respond to the client 305 by sending a response message 335 with information related to the API request 325.

In some examples, the API request 325 sent by the client 305 may include a header 340. The header 340 may include various types of information related to the API request 315, the client 305, or other aspects of the metachannel API 310. In some examples. the header 340 may include a metadata request 342, a configuration metadata request 344, a real-time metrics request 346, client context information 348, a control message 350, or any combination thereof. In a metadata request 342, the client 305 may request particular metadata related to the operation of the metachannel API 310. Such metadata may include information about the metachannel API 310, including performance and status information. In some examples, this information may be specific to the particular client 305 or may be information about the use of the metachannel API 310 in general, taking into account the influence of other clients that may be using the metachannel API 310.

In some examples, a configuration metadata request 344 may include information about the metachannel API 310, including owner or version details, health information (such as a mean time to failure or last request received), state information (e.g. active, started, stopped, under maintenance, upgrade in progress, etc.), geographic information (e.g. location or region of a server), bearer token validity, quota assigned (e.g., a number of requests or amount of data used in a time period), or other information.

In some examples, a real-time metrics request 346 may include metrics including current or expected latency, policy failures for credentials, quota information related to the use of the metachannel API 310, a number of concurrent connections, resolved IP addresses for a particular client request, number of requests and responses used, or other real-time metrics information. In some examples, this information may be specific to the particular client 305 or may be information about the use of the metachannel API 310 in general, taking into account the influence of other clients that may be using the metachannel API 310.

In some examples, the header 340 may include client context information 348. The client context information 348 may include various types of information about the client, such as a name, an address, a geographical location, an IP address, service level agreement information, quota information, latency information, or other information relevant to the client's 305 use of the metachannel API 310.

In some examples, the header 340 may include a control message 350. The control message 350 may contain instructions or commands or controlling aspects of the metachannel API 310. In some examples, the control message 350 may be used to control the metachannel API 310 within a scope. This scope may be specified by the client 305 or by an administrator of the metachannel API 310. Examples of control that may be implemented through control message 315 include starting or stopping the metachannel API 310 for the specified client channel, establishing an active channel for the client 305, switching between different service level agreements or quality of service levels to meet different levels of demand that may enter the flow over time. In some examples, the control message 350 may be based on a trigger event. The trigger event may be an event internal to the metachannel API 310, or may happen external to the metachannel API 310. Additional examples may include the purchase of additional credit related to monetization activities.

In some examples, the API request 325 is received at the endpoint 330 as discussed herein. In some examples, a load balancer 355 may be implemented in the data plane 315. The load balancer 355 may manage how incoming information is balanced across various elements of the metachannel API 310. The load balancer 355 may receive the API request 325 and decide to send the API requests to a portion of the metachannel API 310. The load balancer 355 may be one example of an aspect of the metachannel API 310 that may be controlled by a control message 350 or other information sent from the client 305.

Once received by the data plane 315 through the endpoint 330, a request present in the header 340 of the API request 325 may be identified. As described herein, the header 340 may contain a variety of requests, information, or messages. In some examples, the metadata request 342 may be identified. The metachannel API 310, (and, in some examples more particularly the data plane 315) may be configured with a set of rules, algorithms, or similar logic that is configured for identifying various types of information, commands, or requests found in the header 340, including a metadata request 342.

In some examples, the API request 325 may then be redirected to the metadata plane 320. This may be performed in in a number of different ways, including transmitting the API request 325 from the data plane 315. It may also be performed by intercepting the API request 325 at a proxy 360 of the data plane 315. A gateway of the data plane 315 may also be used in place of the proxy 360. At this point, the proxy 360 may make the identification of the request found in the header 340 of the API request 325. The proxy 360 may be configured with a set of rules, algorithms, or similar logic that is configured for identifying various types of information, commands, or requests found in the header 340 of the API request 325, including a metadata request 342. Depending on this identification the API request 325 may either be sent to workers 365 associated with the data plane 315, or the API request 325 may be sent to the metadata plane 320.

In some examples, where the header 340 contains no request, information, control message, or other elements that should be redirected to the metadata plane 320, the proxy 360 may treat the API request 325 as a request for the metachannel API 310 to perform one or more of the various functions supported by the metachannel API 310. For example, this could include data processing to be performed by the workers 365, and the sending of a subsequent result back to the client 305 through the API endpoint 330. However, in examples where the header 340 contains a request, information, control message, or other element that should be redirected to the metadata plane 320 that is identified by the proxy 360, the requests, information, control message or other element may be sent to the metadata plane 320. In some examples, the entire API request 325 may be sent to the metadata plane 320, while in other examples particular information relating to the request, information, control message, or other element is sent to the metadata plane 320.

In some examples, the metadata plane 320 may include client metrics 370 and a client profile 375. The client metrics 370 may include those metrics discussed herein in relation to the real-time metrics request 346, such as latency, policy failures, quotas, or other metrics discussed herein. The client metrics 370 may also include other metrics related to the client's 305 or the client's 305 use of the metachannel API 310.

In some examples, the metadata plane 320 may include a client profile 375. The client profile may include information about the client 305 that is relevant to the client's 305 use of the metachannel API 310. This information may include geographical location, IP address, usage statistics, other associated users or clients, or other information. In addition, the metadata plane may also store client context information 348 received in the header 340 of the API request 325 that may be used in various ways. For example, such client context information 348 may be used, along with rules, algorithms, or similar logic to make decisions about whether a header 340 of an API request 325 contains a request, information, or control message that should be redirected to the metadata plane 320. In some examples, client context information 348 may be stored in the client profile 375.

In some examples, the metadata requested in a metadata request 342 found in the header 340 of the API request 325 may be retrieved at the metadata plane 320. The metadata retrieved may include metadata related to a metadata request 342, metadata related to this configuration metadata request 344, real-time metrics associated with the real-time metrics request 346, or any combination thereof. In some examples, the metadata to be retrieved may be stored within the metadata plane 320 in the metadata storage 378 of the metadata plane 320. In other examples, the metadata to be retrieved may be stored in a metadata source 380 external to the metadata plane 320. In other examples, the metadata to be retrieved may be stored within a management plane 385 of the metachannel API 310. The management plane 385 may include a management metadata source 390 from which metadata from the management plane may be retrieved. In some examples, the metadata to be retrieved may be consolidated from multiple sources outside the metadata plane 320, which may include the metadata source 380, the management metadata source 390, other sources of metadata, or any combination thereof. In some examples, metadata to be retrieved or consolidated may also be found outside of the metachannel API 310. In some examples, one such metadata is consolidated and may be stored in the metadata storage 378 of the metadata plane 320 so that it may be easily sent to the client 305 in response to the API request 325.

In some examples, in which a control message 350 is identified in the header 340 of the API request 325, one or more management functions 395 of the management plane 385 may be controlled, altered, initiated, terminated, or otherwise influenced by the control message 350. In some examples, the metadata plane 320 may forward the control message 350 to the management functions 395 management plane 385. In some examples, the control message 350 may influence management functions that are found elsewhere in the metachannel API 310. In some examples, the management functions 395 may include those examples of control discussed herein in relation to the control message 350, including starting or stopping the metachannel API 310 for a particular client's 305 channel or channels, establishing active channels, switching between service level agreements, or other management functions.

In some examples, the data plane 315 may receive from the metadata plane 320 a control message 398. This control message 398 may control various aspects of the metachannel API 310. For example, the control message 398 may control aspects of the metachannel API 310 that may be controlled by the control message 350 as described herein. In some examples, this control message 398 may be based on a trigger event. In some examples, this trigger event may be related to requests, commands, or information transmitted by the client 305 in the API request 325. In other examples, this trigger event may be related to other aspects of the metachannel API 310. This trigger event may even be related to elements, events, communications, or information located outside the metachannel API 310.

In some examples, the response message 335 may then be transmitted to the client 305 via the endpoint 330. The response message 335 may indicate the metadata (including metadata related to a metadata request 342, metadata related to this configuration metadata request 344, real-time metrics associated with the real-time metrics request 346, or any combination thereof) that was requested by the client 305 in the header 340 of the API request 325. In cases where client context information 348 is included in the header 340 of the API request 325, the response message 335 may include an acknowledgement of receipt of the client context information 348. In cases where a control message 350 is included in the header 340 of the API request 325, the response message 335 may include acknowledgement of receipt of the control message 350, status updates as to the particular control requested by the control message 350, notice of completion of the particular control requested by the control message 350, other information related to the control message 350 or the particular control requested, or any combination thereof.

In some examples, the information to be included in the response message 335 may be selected based on an identification of the client 305 in the API request 325. In some examples, this identification of the client 305 could be included in the client context information 348 included in the API request 325. For example, the metadata to be indicated in the response 335 message may include metadata related to the particular client's 305 usage of the metachannel API 310, such as particular metadata related to the particular client's 305 quota of API requests 325 allowed.

Figure 4:
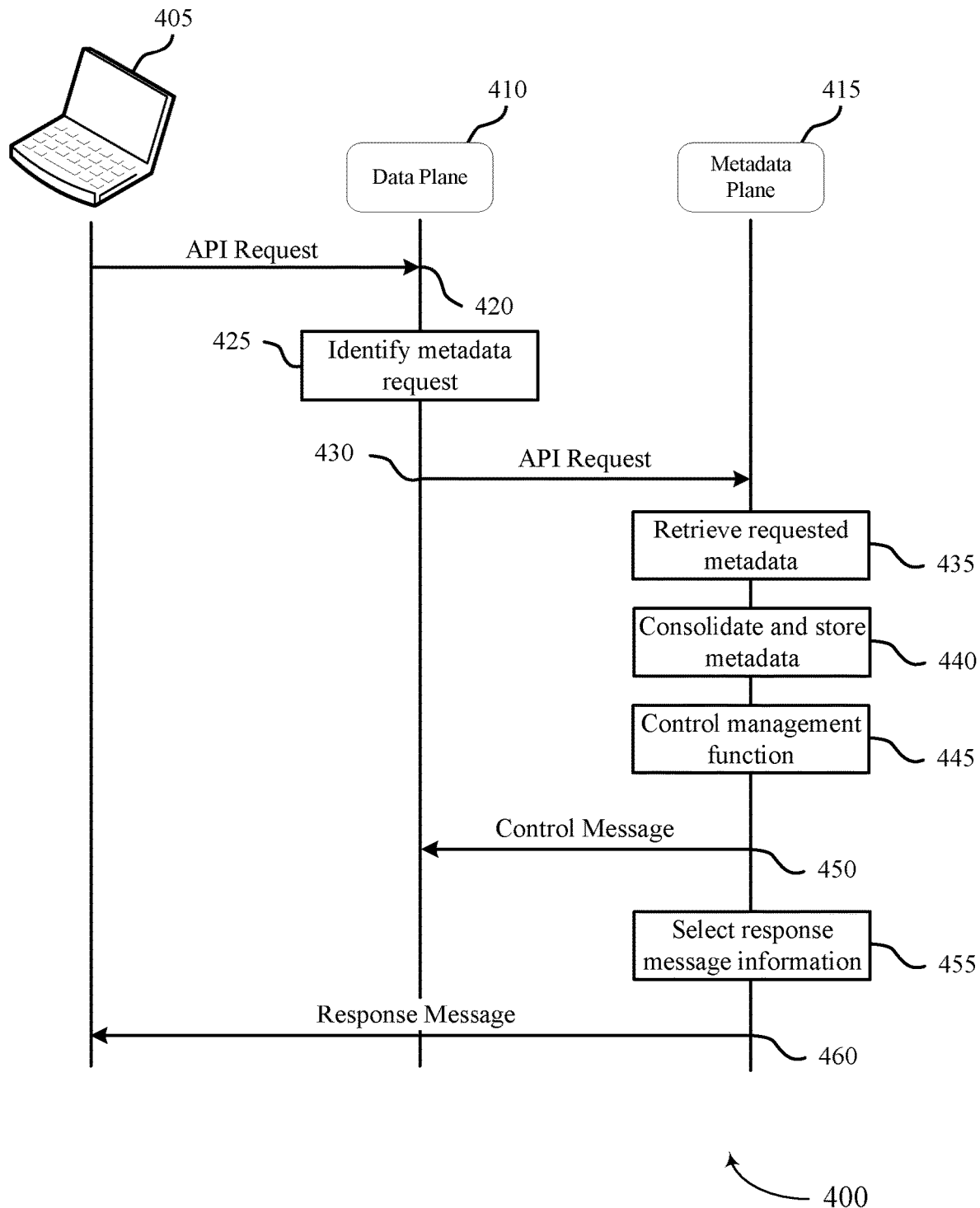
FIG. 4 illustrates an example of a process flow that supports a metadata plane for application programming interface in accordance with aspects of the present disclosure.

FIG. 4 illustrates an example of a process flow 400 that supports a metadata plane for application programming interface in accordance with aspects of the present disclosure. The process flow 400 may include a client 405. The client 405 may communicate with a metachannel API that includes a data plane 410 and a metadata plane 415. The client 405, data plane 410, and metadata plane 415 may be example of corresponding clients, data planes and metadata planes as described with reference to FIGS. 1-3.

At 420, the data plane 410 may receive, from the client 405, an API request at an API endpoint of an API, wherein the API endpoint is configured to process data requests at a data plane of the API. As described with reference to FIGS. 2 and 3, the API request may include a header containing a metadata request 342, a configuration metadata request 344, a real-time metrics request 346, client context information 348, a control message 350, or any combination thereof. In some examples, the data plane 410 may receive at the data plane 410 of the API.

At 425, the data plane 410 identifies, from a header of the API request, a request for metadata associated with the API. The data plane 410 may also identify other requests, information, or commands found in the header of the API request.

At 430, the data plane 410 may redirect the API request to the metadata plane of the API. In some examples, this redirection may be done by transmitting the API request from the data plane of the API to the metadata plane of the API, as described herein in relation to FIGS. 2 and 3. In other examples, this redirection may be done by intercepting, at a proxy or gateway of the data plane of the API, the API request based on the header of the API request indicating the request for metadata associated with the API, as described herein in relation to FIGS. 2 and 3.

At 435 the metadata plane 415 may retrieve, at the metadata plane of the API, the requested metadata based on the header of the API request. In some examples, at least a portion of the requested metadata is retrieved from a management plane of the API, as described herein in relation to FIGS. 2 and 3. In some examples, at least a portion of the requested metadata is stored within the metadata plane of the API, as described herein in relation to FIGS. 2 and 3.

At 440 the retrieving, at the metadata plane 415 of the API, the requested metadata may further include consolidating metadata from one or more sources outside the metadata plane 415 of the API, and storing the consolidated metadata at the metadata plane 415 of the API. In some examples, the metadata consolidated from one or more sources outside the metadata plane 415 may include the metadata source 380 and the management metadata source 390 of the management plane 385 as described in relation to FIG. 3.

At 445, where the API request includes a control message associated with the API, the metadata plane 415 may control a management function of the API based on the control message. In some examples, the management function may include various functions, including those management functions and operations described in relation to FIG. 3, such as the management functions and operations described in connection with the control message 350 and the management functions 395.

At 450 the data plane 410 may receive, at the data plane 410 of the API and from the metadata plane 415 of the API, a control message based on a trigger event. The trigger event may be a trigger event internal to the metachannel API, or it may be external to the metachannel API. The control message may influence various management functions, control functions, or other functions, information, or operations of the metachannel API.

At 455, the metadata plane 415 may select information to be included in a response message based on an identification of the client 405 in the API request. The response message may include a variety of information, including the information described in relation to the response message 335 of FIG. 3.

At 460, the metadata plane 415 may transmit, via the API endpoint and to the client 405, a response message indicating the requested metadata. In some examples, the metadata plane 415 may transmit the requested metadata to the data plane 410, and the data plane 410 may transmit, via the API endpoint and to the client 405, the response message indicating the requested metadata.

Figure 5:
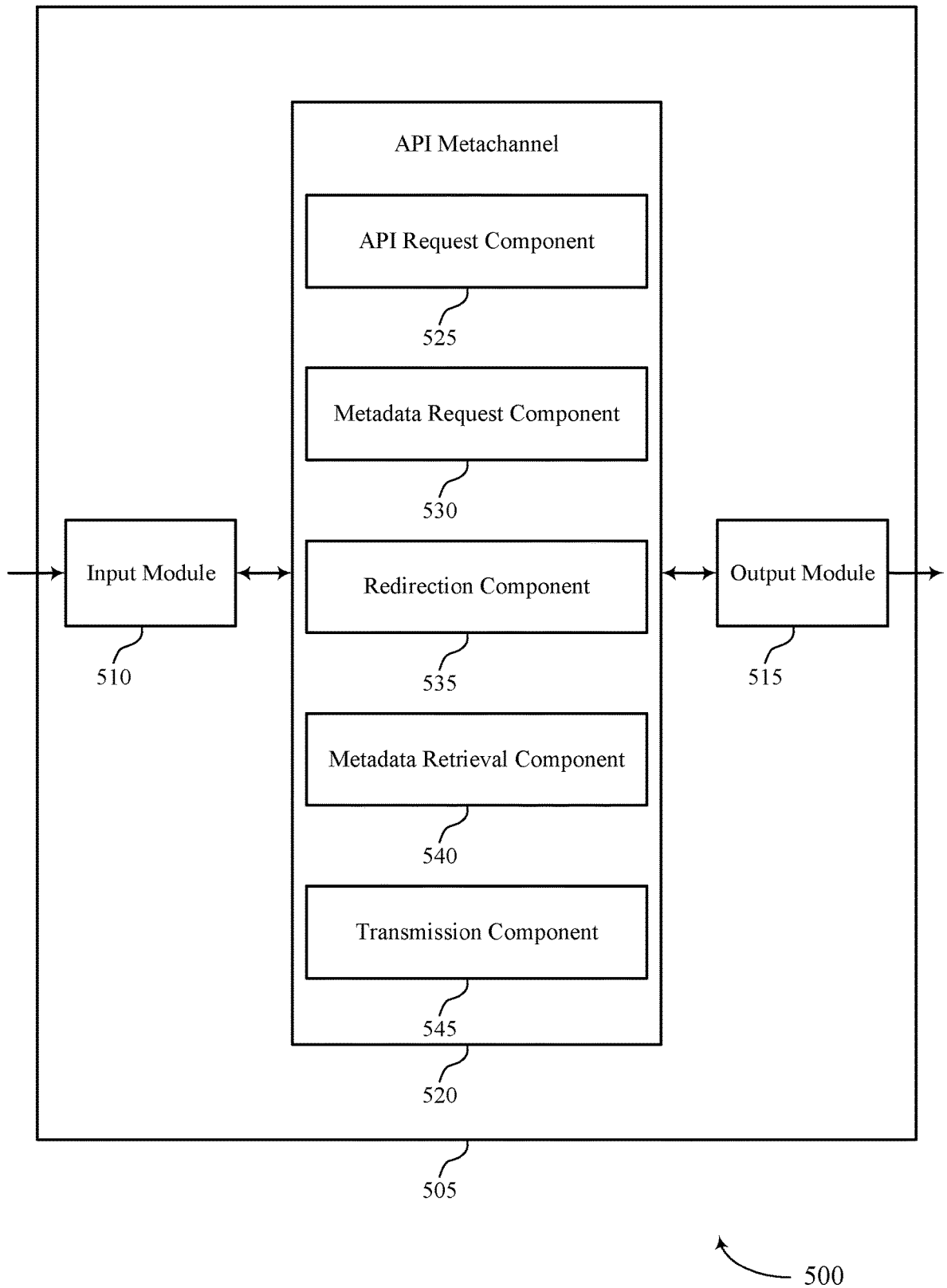
FIG. 5 shows a block diagram of an apparatus that supports a metadata plane for application programming interface in accordance with aspects of the present disclosure.

FIG. 5 shows a block diagram 500 of an apparatus 505 that supports a metadata plane for application programming interface in accordance with aspects of the present disclosure. The apparatus 505 may include an input module 510, an output module 515, and a metachannel API 520. The apparatus 505 may also include a processor. Each of these components may be in communication with one another (e.g., via one or more buses).

The input module 510 may manage input signals for the apparatus 505. For example, the input module 510 may identify input signals based on an interaction with a modem, a keyboard, a mouse, a touchscreen, or a similar apparatus. These input signals may be associated with user input or processing at other components or apparatuses. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the metachannel API 520 to support metadata plane for application programming interface. In some cases, the input module 510 may be a component of an I/O controller 710 as described with reference to FIG. 7.

The output module 515 may manage output signals for the apparatus 505. For example, the output module 515 may receive signals from other components of the apparatus 505, such as the metachannel API 520, and may transmit these signals to other components or apparatus. In some specific examples, the output module 515 may transmit output signals for display in a user interface, for storage in a database or data store, for further processing at a server or server cluster, or for any other processes at any number of apparatus or systems. In some cases, the output module 515 may be a component of an I/O controller 710 as described with reference to FIG. 7.

For example, the metachannel API 520 may include an API request component 525, a metadata request component 530, a redirection component 535, a metadata retrieval component 540, a transmission component 545, or any combination thereof. In some examples, the metachannel API 520, or various components thereof, may be configured to perform various operations (e.g., receiving, monitoring, transmitting) using or otherwise in cooperation with the input module 510, the output module 515, or both. For example, the metachannel API 520 may receive information from the input module 510, send information to the output module 515, or be integrated in combination with the input module 510, the output module 515, or both to receive information, transmit information, or perform various other operations as described herein.

The metachannel API 520 may support data processing at a database server in accordance with examples as disclosed herein. The metachannel API 520 may also support data processing at an application server. The API request component 525 may be configured as or otherwise support a means for receiving, from a client, an API request at an API endpoint of an API, wherein the API endpoint is configured to process data requests at a data plane of the API. The metadata request component 530 may be configured as or otherwise support a means for identifying, from a header of the API request, a request for metadata associated with the API. The redirection component 535 may be configured as or otherwise support a means for redirecting the API request to a metadata plane of the API. The metadata retrieval component 540 may be configured as or otherwise support a means for retrieving, at the metadata plane of the API, the requested metadata based at least in part on the header of the API request. The transmission component 545 may be configured as or otherwise support a means for transmitting, via the API endpoint and to the client, a response message indicating the requested metadata.

Figure 6:
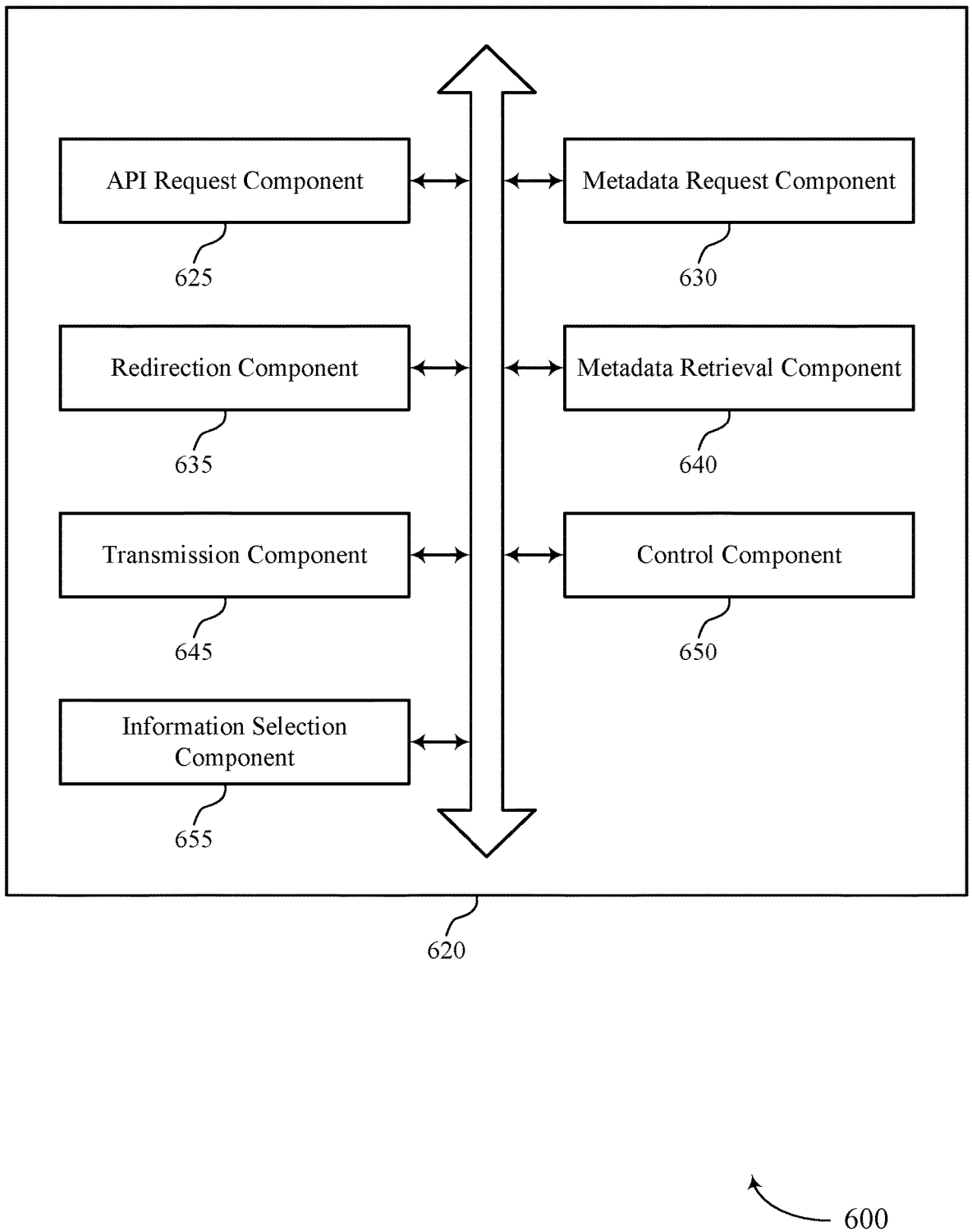
FIG. 6 shows a but who block diagram of a metachannel API that supports a metadata plane for application programming interface in accordance with aspects of the present disclosure.

FIG. 6 shows a block diagram 600 of a metachannel API 620 that supports a metadata plane for application programming interface in accordance with aspects of the present disclosure. The metachannel API 620 may be an example of aspects of a metachannel API or a metachannel API 520, or both, as described herein. The metachannel API 620, or various components thereof, may be an example of means for performing various aspects of metadata plane for application programming interface as described herein. For example, the metachannel API 620 may include an API request component 625, a metadata request component 630, a redirection component 635, a metadata retrieval component 640, a transmission component 645, a control component 650, an information selection component 655, or any combination thereof. Each of these components may communicate, directly or indirectly, with one another (e.g., via one or more buses).

The metachannel API 620 may support data processing at a database server in accordance with examples as disclosed herein. The metachannel API 620 may also support data processing at an application server. The API request component 625 may be configured as or otherwise support a means for receiving, from a client, an API request at an API endpoint of an API, wherein the API endpoint is configured to process data requests at a data plane of the API. The metadata request component 630 may be configured as or otherwise support a means for identifying, from a header of the API request, a request for metadata associated with the API. The redirection component 635 may be configured as or otherwise support a means for redirecting the API request to a metadata plane of the API. The metadata retrieval component 640 may be configured as or otherwise support a means for retrieving, at the metadata plane of the API, the requested metadata based at least in part on the header of the API request. The transmission component 645 may be configured as or otherwise support a means for transmitting, via the API endpoint and to the client, a response message indicating the requested metadata.

In some examples, to support redirecting the API request to the metadata plane of the API, the redirection component 635 may be configured as or otherwise support a means for transmitting the API request from the data plane of the API to the metadata plane of the API. In some examples, the API request includes client context information associated with the client. In some examples, to support redirecting the API request to the metadata plane of the API, the redirection component 635 may be configured as or otherwise support a means for intercepting, at a proxy or gateway of the data plane of the API, the API request based at least in part on the header of the API request indicating the request for metadata associated with the API.

In some examples, the API request comprises a control message associated with the API, and the control component 650 may be configured as or otherwise support a means for controlling a management function of the API based at least in part on the control message. In some examples, the API request comprises a request for configuration metadata associated with the API. In some examples, the API request comprises a request for real-time metrics associated with the API.

In some examples, the control component 650 may be configured as or otherwise support a means for receiving, at the data plane of the API and from the metadata plane of the API, a control message based at least in part on a trigger event. In some examples, the information selection component 655 may be configured as or otherwise support a means for selecting information to be included in the response message based at least in part on an identification of the client in the API request.

In some examples, to support retrieving, at the metadata plane of the API, the requested metadata, the metadata retrieval component 640 may be configured as or otherwise support a means for consolidating metadata from one or more sources outside the metadata plane of the API. In some examples, to support retrieving, at the metadata plane of the API, the requested metadata, the metadata retrieval component 640 may be configured as or otherwise support a means for storing the consolidated metadata at the metadata plane of the API. In some examples, at least a portion of the requested metadata is retrieved from a management plane of the API. In some examples, at least a portion of the requested metadata is stored within the metadata plane of the API.

Figure 7:
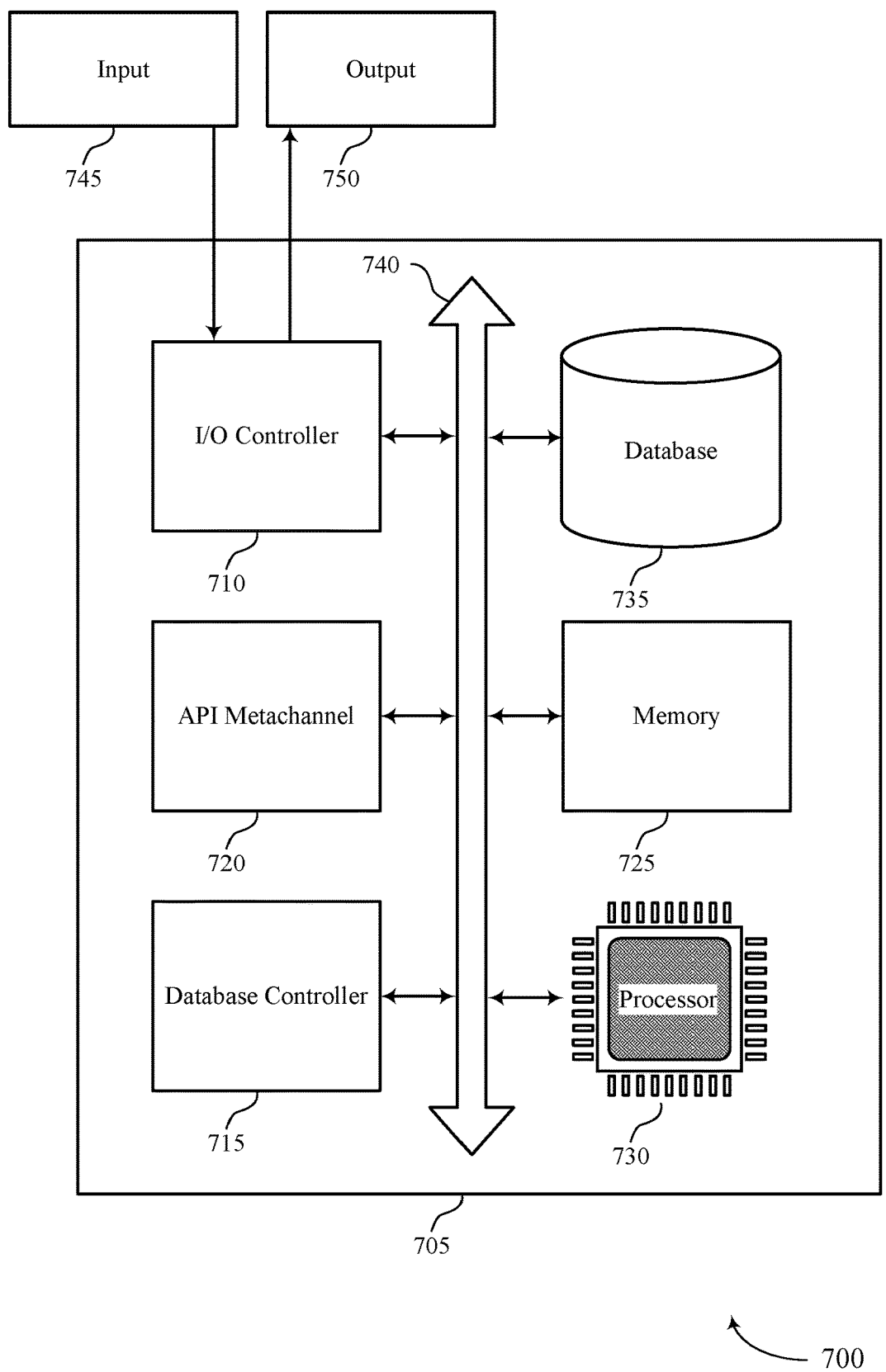
FIG. 7 shows a diagram of a system including an apparatus that supports a metadata plane for application programming interface in accordance with aspects of the present disclosure.

FIG. 7 shows a diagram of a system 700 including an apparatus 705 that supports a metadata plane for application programming interface in accordance with aspects of the present disclosure. The apparatus 705 may be an example of or include the components of an apparatus 505 as described herein. The apparatus 705 may include components for bi-directional data communications including components for transmitting and receiving communications, such as a metachannel API 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the apparatus 705. The I/O controller 710 may also manage peripherals not integrated into the apparatus 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar apparatus. In some cases, the I/O controller 710 may be implemented as part of a processor. In some cases, a user may interact with the apparatus 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or apparatus.

The processor 730 may include an intelligent hardware apparatus, (e.g., a general-purpose processor, a DSP, a CPU, a microcontroller, an ASIC, an FPGA, a programmable logic apparatus, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting metadata plane for application programming interface).

The metachannel API 720 may support data processing at a database server in accordance with examples as disclosed herein. The metachannel API 620 may also support data processing at an application server. For example, the metachannel API 720 may be configured as or otherwise support a means for receiving, from a client, an API request at an API endpoint of an API, wherein the API endpoint is configured to process data requests at a data plane of the API. The metachannel API 720 may be configured as or otherwise support a means for identifying, from a header of the API request, a request for metadata associated with the API. The metachannel API 720 may be configured as or otherwise support a means for redirecting the API request to a metadata plane of the API. The metachannel API 720 may be configured as or otherwise support a means for retrieving, at the metadata plane of the API, the requested metadata based at least in part on the header of the API request. The metachannel API 720 may be configured as or otherwise support a means for transmitting, via the API endpoint and to the client, a response message indicating the requested metadata.

Figure 8:
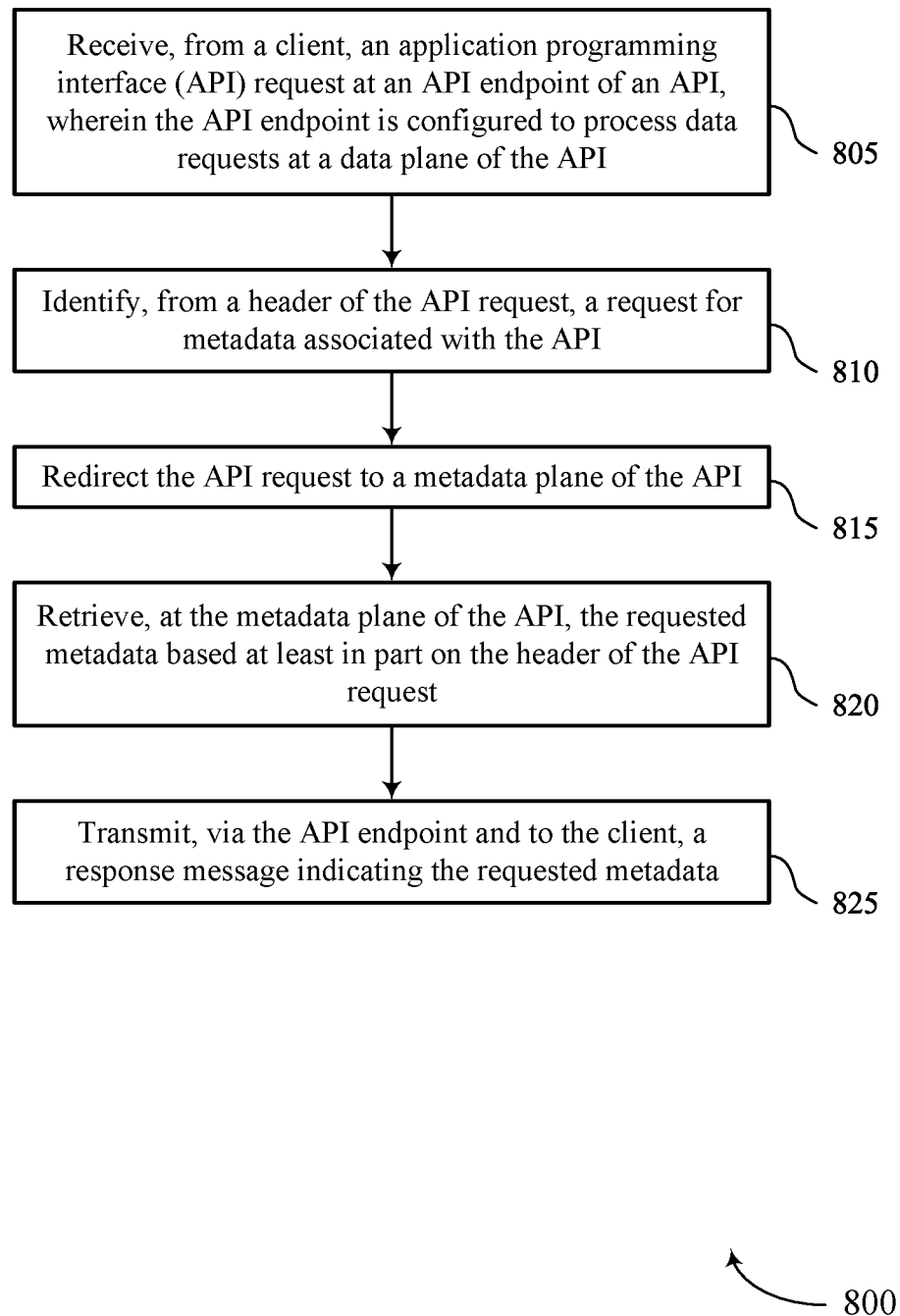
FIGS. 8 through 12 show flowcharts illustrating methods that support a metadata plane for application programming interface in accordance with aspects of the present disclosure.

FIG. 8 shows a flowchart illustrating a method 800 that supports a metadata plane for application programming interface in accordance with aspects of the present disclosure. The operations of the method 800 may be implemented by a database server, an application server, or components thereof herein. For example, the operations of the method 800 may be performed by a database server as described with reference to FIGS. 1 through 7. In some examples, a database server may execute a set of instructions to control the functional elements of the database server to perform the described functions. Additionally or alternatively, the database server may perform aspects of the described functions using special-purpose hardware.

At 805, the method may include receiving, from a client, an API request at an API endpoint of an API, wherein the API endpoint is configured to process data requests at a data plane of the API. The operations of 805 may be performed in accordance with examples as disclosed herein. In some examples, aspects of the operations of 805 may be performed by an API request component 625 as described with reference to FIG. 6.

At 810, the method may include identifying, from a header of the API request, a request for metadata associated with the API. The operations of 810 may be performed in accordance with examples as disclosed herein. In some examples, aspects of the operations of 810 may be performed by a metadata request component 630 as described with reference to FIG. 6.

At 815, the method may include redirecting the API request to a metadata plane of the API. The operations of 815 may be performed in accordance with examples as disclosed herein. In some examples, aspects of the operations of 815 may be performed by a redirection component 635 as described with reference to FIG. 6.

At 820, the method may include retrieving, at the metadata plane of the API, the requested metadata based at least in part on the header of the API request. The operations of 820 may be performed in accordance with examples as disclosed herein. In some examples, aspects of the operations of 820 may be performed by a metadata retrieval component 640 as described with reference to FIG. 6.

At 825, the method may include transmitting, via the API endpoint and to the client, a response message indicating the requested metadata. The operations of 825 may be performed in accordance with examples as disclosed herein. In some examples, aspects of the operations of 825 may be performed by a transmission component 645 as described with reference to FIG. 6.

Figure 9:
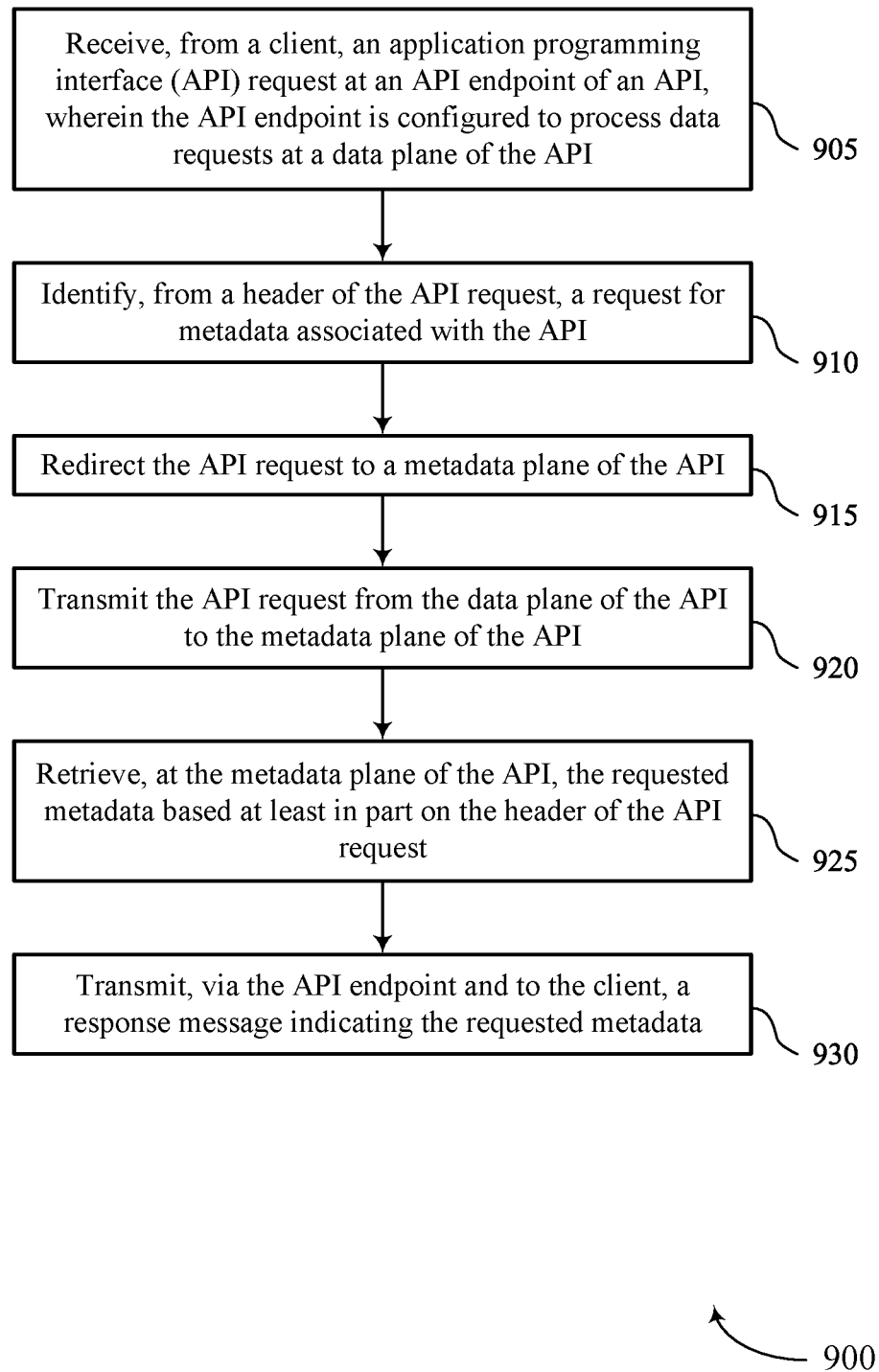

FIG. 9 shows a flowchart illustrating a method 900 that supports a metadata plane for application programming interface in accordance with aspects of the present disclosure. The operations of the method 900 may be implemented by a database server, an application server, or components thereof herein. For example, the operations of the method 900 may be performed by a database server as described with reference to FIGS. 1 through 7. In some examples, a database server may execute a set of instructions to control the functional elements of the database server to perform the described functions. Additionally or alternatively, the database server may perform aspects of the described functions using special-purpose hardware.

At 905, the method may include receiving, from a client, an API request at an API endpoint of an API, wherein the API endpoint is configured to process data requests at a data plane of the API. The operations of 905 may be performed in accordance with examples as disclosed herein. In some examples, aspects of the operations of 905 may be performed by an API request component 625 as described with reference to FIG. 6.

At 910, the method may include identifying, from a header of the API request, a request for metadata associated with the API. The operations of 910 may be performed in accordance with examples as disclosed herein. In some examples, aspects of the operations of 910 may be performed by a metadata request component 630 as described with reference to FIG. 6.

At 915, the method may include redirecting the API request to a metadata plane of the API. The operations of 915 may be performed in accordance with examples as disclosed herein. In some examples, aspects of the operations of 915 may be performed by a redirection component 635 as described with reference to FIG. 6.

At 920, the method may include transmitting the API request from the data plane of the API to the metadata plane of the API. The operations of 920 may be performed in accordance with examples as disclosed herein. In some examples, aspects of the operations of 920 may be performed by a redirection component 635 as described with reference to FIG. 6.

At 925, the method may include retrieving, at the metadata plane of the API, the requested metadata based at least in part on the header of the API request. The operations of 925 may be performed in accordance with examples as disclosed herein. In some examples, aspects of the operations of 925 may be performed by a metadata retrieval component 640 as described with reference to FIG. 6.

At 930, the method may include transmitting, via the API endpoint and to the client, a response message indicating the requested metadata. The operations of 930 may be performed in accordance with examples as disclosed herein. In some examples, aspects of the operations of 930 may be performed by a transmission component 645 as described with reference to FIG. 6.

Figure 10:
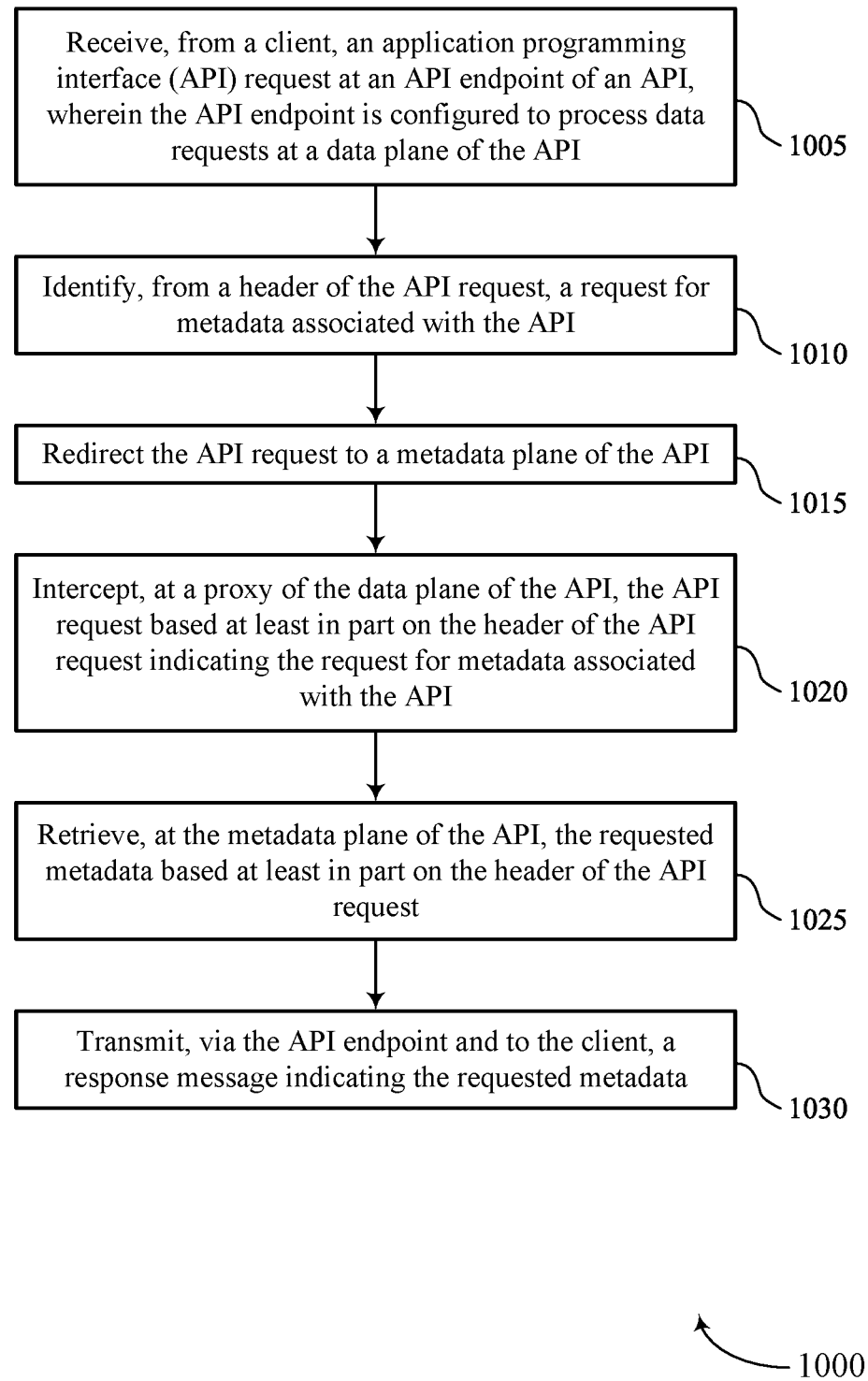

FIG. 10 shows a flowchart illustrating a method 1000 that supports a metadata plane for application programming interface in accordance with aspects of the present disclosure. The operations of the method 1000 may be implemented by a database server, an application server, or components thereof herein. For example, the operations of the method 1000 may be performed by a database server as described with reference to FIGS. 1 through 7. In some examples, a database server may execute a set of instructions to control the functional elements of the database server to perform the described functions. Additionally or alternatively, the database server may perform aspects of the described functions using special-purpose hardware.

At 1005, the method may include receiving, from a client, an API request at an API endpoint of an API, wherein the API endpoint is configured to process data requests at a data plane of the API. The operations of 1005 may be performed in accordance with examples as disclosed herein. In some examples, aspects of the operations of 1005 may be performed by an API request component 625 as described with reference to FIG. 6.

At 1010, the method may include identifying, from a header of the API request, a request for metadata associated with the API. The operations of 1010 may be performed in accordance with examples as disclosed herein. In some examples, aspects of the operations of 1010 may be performed by a metadata request component 630 as described with reference to FIG. 6.

At 1015, the method may include redirecting the API request to a metadata plane of the API. The operations of 1015 may be performed in accordance with examples as disclosed herein. In some examples, aspects of the operations of 1015 may be performed by a redirection component 635 as described with reference to FIG. 6.

At 1020, the method may include intercepting, at a proxy or gateway of the data plane of the API, the API request based at least in part on the header of the API request indicating the request for metadata associated with the API. The operations of 1020 may be performed in accordance with examples as disclosed herein. In some examples, aspects of the operations of 1020 may be performed by a redirection component 635 as described with reference to FIG. 6.

At 1025, the method may include retrieving, at the metadata plane of the API, the requested metadata based at least in part on the header of the API request. The operations of 1025 may be performed in accordance with examples as disclosed herein. In some examples, aspects of the operations of 1025 may be performed by a metadata retrieval component 640 as described with reference to FIG. 6.

At 1030, the method may include transmitting, via the API endpoint and to the client, a response message indicating the requested metadata. The operations of 1030 may be performed in accordance with examples as disclosed herein. In some examples, aspects of the operations of 1030 may be performed by a transmission component 645 as described with reference to FIG. 6.

Figure 11:
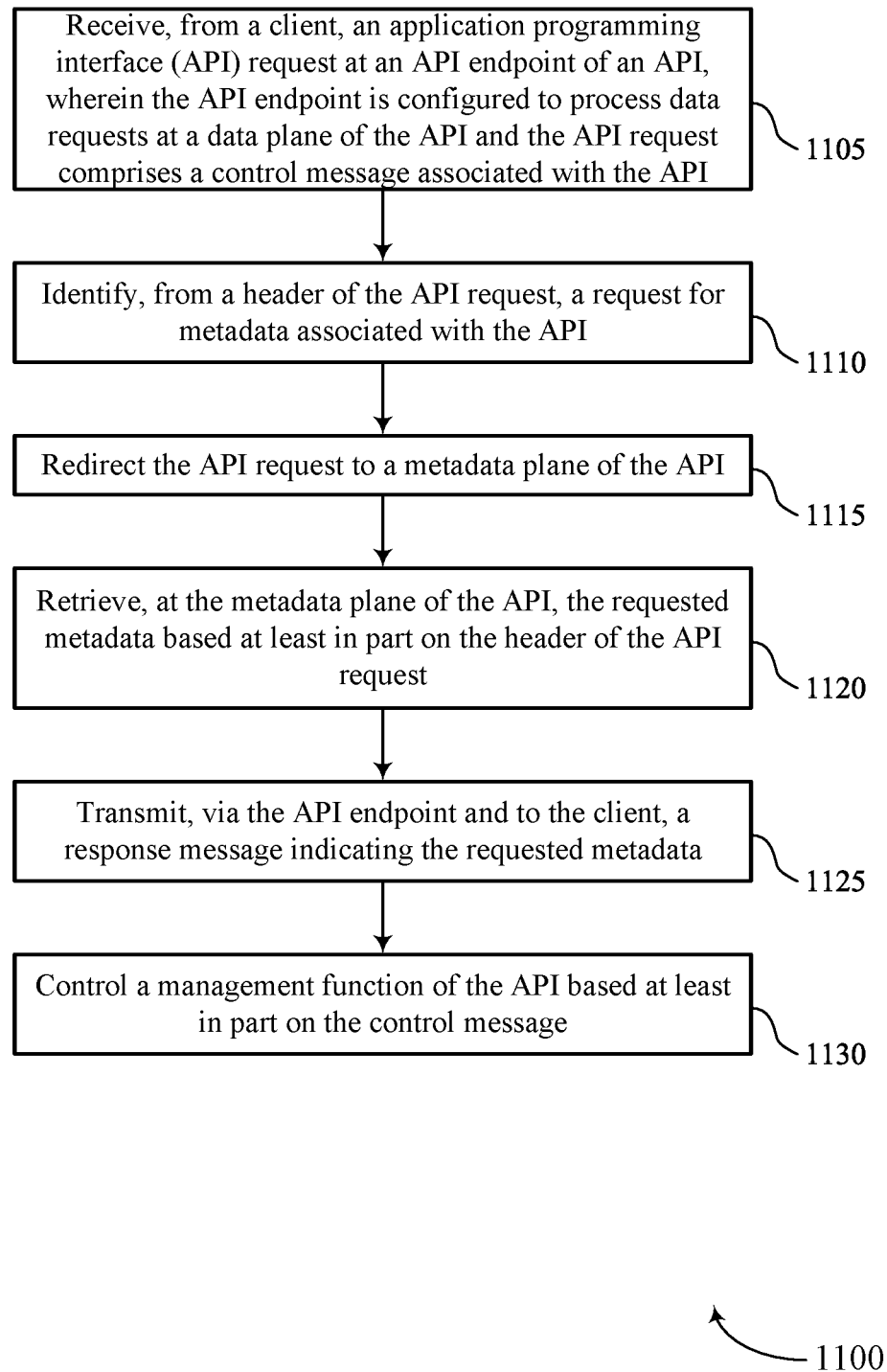

FIG. 11 shows a flowchart illustrating a method 1100 that supports a metadata plane for application programming interface in accordance with aspects of the present disclosure. The operations of the method 1100 may be implemented by a database server, an application server, or components thereof herein. For example, the operations of the method 1100 may be performed by a database server as described with reference to FIGS. 1 through 7. In some examples, a database server may execute a set of instructions to control the functional elements of the database server to perform the described functions. Additionally or alternatively, the database server may perform aspects of the described functions using special-purpose hardware.

At 1105, the method may include receiving, from a client, an API request at an API endpoint of an API, wherein the API endpoint is configured to process data requests at a data plane of the API and the API request comprises a control message associated with the API. The operations of 1105 may be performed in accordance with examples as disclosed herein. In some examples, aspects of the operations of 1105 may be performed by an API request component 625 as described with reference to FIG. 6.

At 1110, the method may include identifying, from a header of the API request, a request for metadata associated with the API. The operations of 1110 may be performed in accordance with examples as disclosed herein. In some examples, aspects of the operations of 1110 may be performed by a metadata request component 630 as described with reference to FIG. 6.

At 1115, the method may include redirecting the API request to a metadata plane of the API. The operations of 1115 may be performed in accordance with examples as disclosed herein. In some examples, aspects of the operations of 1115 may be performed by a redirection component 635 as described with reference to FIG. 6.

At 1120, the method may include retrieving, at the metadata plane of the API, the requested metadata based at least in part on the header of the API request. The operations of 1120 may be performed in accordance with examples as disclosed herein. In some examples, aspects of the operations of 1120 may be performed by a metadata retrieval component 640 as described with reference to FIG. 6.

At 1125, the method may include transmitting, via the API endpoint and to the client, a response message indicating the requested metadata. The operations of 1125 may be performed in accordance with examples as disclosed herein. In some examples, aspects of the operations of 1125 may be performed by a transmission component 645 as described with reference to FIG. 6.

At 1130, the method may include controlling a management function of the API based at least in part on the control message. The operations of 1130 may be performed in accordance with examples as disclosed herein. In some examples, aspects of the operations of 1130 may be performed by a control component 650 as described with reference to FIG. 6.

Figure 12:
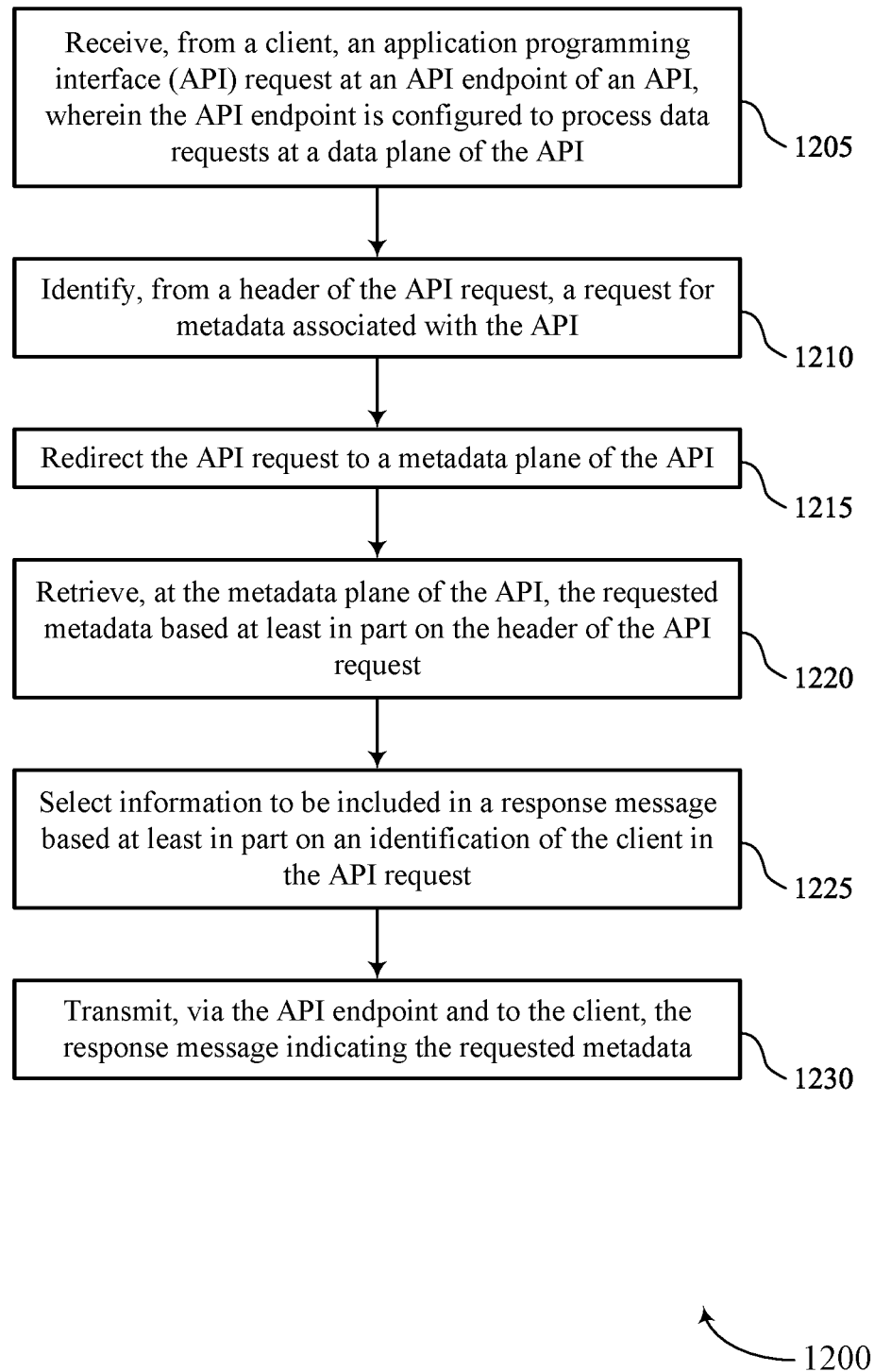

FIG. 12 shows a flowchart illustrating a method 1200 that supports a metadata plane for application programming interface in accordance with aspects of the present disclosure. The operations of the method 1200 may be implemented by a database server, an application server, or components thereof as described herein. For example, the operations of the method 1200 may be performed by a database server as described with reference to FIGS. 1 through 7. In some examples, a database server may execute a set of instructions to control the functional elements of the database server to perform the described functions. Additionally or alternatively, the database server may perform aspects of the described functions using special-purpose hardware.

At 1205, the method may include receiving, from a client, an API request at an API endpoint of an API, wherein the API endpoint is configured to process data requests at a data plane of the API. The operations of 1205 may be performed in accordance with examples as disclosed herein. In some examples, aspects of the operations of 1205 may be performed by an API request component 625 as described with reference to FIG. 6.

At 1210, the method may include identifying, from a header of the API request, a request for metadata associated with the API. The operations of 1210 may be performed in accordance with examples as disclosed herein. In some examples, aspects of the operations of 1210 may be performed by a metadata request component 630 as described with reference to FIG. 6.

At 1215, the method may include redirecting the API request to a metadata plane of the API. The operations of 1215 may be performed in accordance with examples as disclosed herein. In some examples, aspects of the operations of 1215 may be performed by a redirection component 635 as described with reference to FIG. 6.

At 1220, the method may include retrieving, at the metadata plane of the API, the requested metadata based at least in part on the header of the API request. The operations of 1220 may be performed in accordance with examples as disclosed herein. In some examples, aspects of the operations of 1220 may be performed by a metadata retrieval component 640 as described with reference to FIG. 6.

At 1225, the method may include selecting information to be included in a response message based at least in part on an identification of the client in the API request. The operations of 1225 may be performed in accordance with examples as disclosed herein. In some examples, aspects of the operations of 1225 may be performed by an information selection component 655 as described with reference to FIG. 6.

At 1230, the method may include transmitting, via the API endpoint and to the client, the response message indicating the requested metadata. The operations of 1230 may be performed in accordance with examples as disclosed herein. In some examples, aspects of the operations of 1230 may be performed by a transmission component 645 as described with reference to FIG. 6.

A method for data processing at a database server is described. The method may include receiving, from a client, an API request at an access point (API) endpoint of an API, wherein the API endpoint is configured to process data requests at a data plane of the API, identifying, from a header of the API request, a request for metadata associated with the API, redirecting the API request to a metadata plane of the API, retrieving, at the metadata plane of the API, the requested metadata based at least in part on the header of the API request, and transmitting, via the API endpoint and to the client, a response message indicating the requested metadata.

An apparatus for data processing at a database server is described. The apparatus may include a processor, memory in electronic communication with the processor, and instructions stored in the memory. The instructions may be executable by the processor to cause the apparatus to receive, from a client, an API request at an API endpoint of an API, wherein the API endpoint is configured to process data requests at a data plane of the API, identify, from a header of the API request, a request for metadata associated with the API, redirect the API request to a metadata plane of the API, retrieve, at the metadata plane of the API, the requested metadata based at least in part on the header of the API request, and transmit, via the API endpoint and to the client, a response message indicating the requested metadata.

Another apparatus for data processing at a database server is described. The apparatus may include means for receiving, from a client, an API request at an API endpoint of an API, wherein the API endpoint is configured to process data requests at a data plane of the API, means for identifying, from a header of the API request, a request for metadata associated with the API, means for redirecting the API request to a metadata plane of the API, means for retrieving, at the metadata plane of the API, the requested metadata based at least in part on the header of the API request, and means for transmitting, via the API endpoint and to the client, a response message indicating the requested metadata.

A non-transitory computer-readable medium storing code for data processing at a database server is described. The code may include instructions executable by a processor to receive, from a client, an API request at an API endpoint of an API, wherein the API endpoint is configured to process data requests at a data plane of the API, identify, from a header of the API request, a request for metadata associated with the API, redirect the API request to a metadata plane of the API, retrieve, at the metadata plane of the API, the requested metadata based at least in part on the header of the API request, and transmit, via the API endpoint and to the client, a response message indicating the requested metadata.

In some examples of the method, apparatuses, and non-transitory computer-readable medium described herein, redirecting the API request to the metadata plane of the API may include operations, features, means, or instructions for transmitting the API request from the data plane of the API to the metadata plane of the API.

In some examples of the method, apparatuses, and non-transitory computer-readable medium described herein, the API request includes client context information associated with the client.

In some examples of the method, apparatuses, and non-transitory computer-readable medium described herein, redirecting the API request to the metadata plane of the API may include operations, features, means, or instructions for intercepting, at a proxy or gateway of the data plane of the API, the API request based at least in part on the header of the API request indicating the request for metadata associated with the API.

In some examples of the method, apparatuses, and non-transitory computer-readable medium described herein, the API request comprises a control message associated with the API and the method, apparatuses, and non-transitory computer-readable medium may include further operations, features, means, or instructions for controlling a management function of the API based at least in part on the control message.

In some examples of the method, apparatuses, and non-transitory computer-readable medium described herein, the API request comprises a request for configuration metadata associated with the API.

In some examples of the method, apparatuses, and non-transitory computer-readable medium described herein, the API request comprises a request for real-time metrics associated with the API.

Some examples of the method, apparatuses, and non-transitory computer-readable medium described herein may further include operations, features, means, or instructions for receiving, at the data plane of the API and from the metadata plane of the API, a control message based at least in part on a trigger event.

Some examples of the method, apparatuses, and non-transitory computer-readable medium described herein may further include operations, features, means, or instructions for selecting information to be included in the response message based at least in part on an identification of the client in the API request.

In some examples of the method, apparatuses, and non-transitory computer-readable medium described herein, retrieving, at the metadata plane of the API, the requested metadata may include operations, features, means, or instructions for consolidating metadata from one or more sources outside the metadata plane of the API and storing the consolidated metadata at the metadata plane of the API.

In some examples of the method, apparatuses, and non-transitory computer-readable medium described herein, at least a portion of the requested metadata may be retrieved from a management plane of the API.

In some examples of the method, apparatuses, and non-transitory computer-readable medium described herein, at least a portion of the requested metadata may be stored within the metadata plane of the API.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatus are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic apparatus, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing apparatus (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage apparatus, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:
    receiving, from a client, an application programming interface (API) request at an API endpoint of an API, wherein the API endpoint is configured to process data requests at a data plane of the API and the API request comprises a request for metadata associated with the API, the metadata comprising configuration metadata associated with the API, real-time metrics associated with the API, or both;
    identifying, from a header of the API request, the request for metadata associated with the API;
    redirecting the API request to a metadata plane of the API;
    retrieving, at the metadata plane of the API, the requested metadata based at least in part on the header of the API request; and
    transmitting, via the API endpoint and to the client, a response message indicating the requested metadata.

2. The method of claim 1, wherein redirecting the API request to the metadata plane of the API further comprises:
    transmitting the API request from the data plane of the API to the metadata plane of the API.

3. The method of claim 2, wherein the API request includes client context information associated with the client.

4. The method of claim 1, wherein redirecting the API request to the metadata plane of the API further comprises:
    intercepting, at a proxy of the data plane of the API, the API request based at least in part on the header of the API request indicating the request for metadata associated with the API.

5. The method of claim 1, wherein the API request comprises a control message associated with the API, the method further comprising:
    controlling a management function of the API based at least in part on the control message.

6. The method of claim 1, further comprising:
    receiving, at the data plane of the API and from the metadata plane of the API, a control message based at least in part on a trigger event.

7. The method of claim 1, further comprising:
    selecting information to be included in the response message based at least in part on an identification of the client in the API request.

8. The method of claim 1, wherein retrieving, at the metadata plane of the API, the requested metadata further comprises:
    consolidating metadata from one or more sources outside the metadata plane of the API; and
    storing the consolidated metadata at the metadata plane of the API.

9. The method of claim 1, wherein at least a portion of the requested metadata is retrieved from a management plane of the API.

10. The method of claim 1, wherein at least a portion of the requested metadata is stored within the metadata plane of the API.

11. An apparatus for data processing at an application server, comprising:
    a processor;
    memory coupled with the processor; and
    instructions stored in the memory and executable by the processor to cause the apparatus to:
        receive, from a client, an application programming interface (API) request at an API endpoint of an API, wherein the API endpoint is configured to process data requests at a data plane of the API and the API request comprises a request for metadata associated with the API, the metadata comprising configuration metadata associated with the API, real-time metrics associated with the API, or both;
        identify, from a header of the API request, the request for metadata associated with the API;
        redirect the API request to a metadata plane of the API;
        retrieve, at the metadata plane of the API, the requested metadata based at least in part on the header of the API request; and
        transmit, via the API endpoint and to the client, a response message indicating the requested metadata.

12. The apparatus of claim 11, wherein the instructions to redirect the API request to the metadata plane of the API are further executable by the processor to cause the apparatus to:
    transmit the API request from the data plane of the API to the metadata plane of the API.

13. The apparatus of claim 11, wherein the instructions to redirect the API request to the metadata plane of the API are further executable by the processor to cause the apparatus to:
    intercept, at a proxy of the data plane of the API, the API request based at least in part on the header of the API request indicating the request for metadata associated with the API.

14. The apparatus of claim 11, wherein the API request comprises a control message associated with the API, and the instructions are further executable by the processor to cause the apparatus to:
    control a management function of the API based at least in part on the control message.

15. The apparatus of claim 11, wherein the instructions are further executable by the processor to cause the apparatus to:
    receive, at the data plane of the API and from the metadata plane of the API, a control message based at least in part on a trigger event.

16. The apparatus of claim 11, wherein the instructions are further executable by the processor to cause the apparatus to:
    select information to be included in the response message based at least in part on an identification of the client in the API request.

17. The apparatus of claim 11, wherein the instructions to retrieve, at the metadata plane of the API, the requested metadata are further executable by the processor to cause the apparatus to:
    consolidate metadata from one or more sources outside the metadata plane of the API; and
    store the consolidated metadata at the metadata plane of the API.

18. A non-transitory computer-readable medium storing code for data processing at an application server, the code comprising instructions executable by a processor to:

receive, from a client, an application programming interface (API) request at an API endpoint of an API, wherein the API endpoint is configured to process data requests at a data plane of the API and the API request comprises a request for metadata associated with the API, the metadata comprising configuration metadata associated with the API, real-time metrics associated with the API, or both;

identify, from a header of the API request, the request for metadata associated with the API;

redirect the API request to a metadata plane of the API;

retrieve, at the metadata plane of the API, the requested metadata based at least in part on the header of the API request; and transmit, via the API endpoint and to the client, a response message indicating the requested metadata.

* * * * *